(12) United States Patent
Komine (10) Patent No.: US 6,915,722 B2
(45) Date of Patent: Jul. 12, 2005

(54) CLAMPING NUT AND TOOL HOLDER WITH THE CLAMPING NUT, AND SPANNER

(75) Inventor: Tsuyoshi Komine, Hyogo (JP)

(73) Assignee: Big Alpha Co., Inc. (JP)

( * ) Notice: Subject to any disclaimer, the term of this patent is extended or adjusted under 35 U.S.C. 154(b) by 174 days.

(21) Appl. No.: 10/326,531

(22) Filed: Dec. 19, 2002

(65) Prior Publication Data

US 2004/0007096 A1 Jan. 15, 2004

(30) Foreign Application Priority Data

Jul. 11, 2002 (JP) ........................................ 2002-202903

(51) Int. Cl.$^7$ ............................................ B25B 13/00
(52) U.S. Cl. ............................ 81/59.1; 408/57; 279/20
(58) Field of Search ............................ 81/59.1; 408/57, 408/56; 279/20, 53, 157; 409/136; 269/909; 29/281.1

(56) References Cited

U.S. PATENT DOCUMENTS

| | | | |
|---|---|---|---|
| 3,750,498 A | * 8/1973 | Willen ......................... | 82/158 |
| 3,829,109 A | 8/1974 | Koch | |
| 4,902,177 A | * 2/1990 | Burnett ....................... | 409/234 |
| 5,368,421 A | * 11/1994 | Head ........................... | 408/240 |
| 5,596,913 A | * 1/1997 | Matsubara et al. .......... | 81/59.1 |
| 5,775,857 A | * 7/1998 | Johne .......................... | 409/234 |
| 5,984,595 A | * 11/1999 | Mizoguchi ................... | 408/57 |

FOREIGN PATENT DOCUMENTS

| | | |
|---|---|---|
| EP | 0 637 484 A | 2/1995 |
| GB | 2 186 821 A | 8/1987 |
| JP | 5-26208 | 4/1993 |
| JP | 7-68473 | 7/1995 |

* cited by examiner

*Primary Examiner*—Joseph J. Hail, III
*Assistant Examiner*—Alvin J Grant
(74) *Attorney, Agent, or Firm*—Wolf, Greenfield & Sacks, P.C.

(57) ABSTRACT

This invention provides a clamping nut which prevents, at the time of rotation of the clamping nut, a fastening force that is imparted in the radial direction of the clamping nut towards the inside of the clamping nut, from operating on a converting part formed on the inner surface of the clamping nut, thereby enhancing rotation efficiency and making it possible to securely clamp a clamp object member. This invention also provides a tool holder with the above-described clamping nut, and a spanner for the fastening of the clamping nut. The clamping nut has an annular groove which takes the form of an annular shape over its outer surface in at least a section of the area on its outer surface that corresponds to a female screw, and which will not come in contact with the spanner. Alternatively, the spanner has a holding part for holding the outer surface of the clamping nut, and this holding part includes a non-contact area which takes the form of an annular shape along the holding part and which will not come in contact with at least a section of the area that corresponds to the female screw of the clamping nut.

17 Claims, 8 Drawing Sheets

CLAMPING NUT AND TOOL HOLDER WITH THE CLAMPING NUT, AND SPANNER

BACKGROUND OF THE INVENTION

1. Field of the Invention

The present invention relates to a clamping nut located in a rotatable manner on the outer surface of a clamp object member, for clamping or releasing the clamp object member. This invention also relates to a tool holder with this clamping nut and a spanner for causing the clamping nut to rotate and clamp the clamp object member.

2. Description of the Related Art various kinds of conventional clamping nuts are known for clamping a clamp object member by mounting any of the clamping nuts on the outer surface of the clamp object member and causing the clamping nut to rotate. On the inner surface of this clamping nut, a converting part (such as a screw) is formed for the conversion of the rotary motion of the clamping nut into that of rectilinear motion. This rectilinear motion causes the clamping nut to move back and forth in the axial direction of the clamp object member, thereby clamping or releasing the clamp object member.

One example of utilization of this clamping mechanism is as a tool holder which includes: a tool holder body for holding a tool through the medium of a collet; and a clamping nut mounted in a rotatable manner on the tool holder body, for clamping both the tool holder body and the collet by means of rotary motion.

The tool holder of this structure typically has a screw, and a needle roller part or the like that is formed on the inner surface of the clamping nut, for the purpose of converting the rotary motion into rectilinear motion. Moreover, on the outer surface of the clamping nut, knurling is applied and a concave part or an engagement groove is formed for the purpose of engagement with the spanner for rotation of the clamping nut. The spanner is made to engage with the concave part or the engagement groove of the clamping nut and causes the clamping nut to rotate. Accordingly, the clamping nut is used to clamp the tool holder body, thereby causing the tool holder body to securely hold the tool.

An example of such tool holders includes one described in Japanese Utility Model Laid-Open (Kokai) Publication No. HEI 5-26208 A tool holder (or chuck) described in this publication is constructed in a manner such that the outer surface of a clamping nut (or outer sleeve) mounted on a tool holder body (or chuck body) is formed as a complete cylindrical surface without any groove or knurl for engagement with a spanner, and this complete cylindrical surface is the section where the belt of a belt spanner is to be wound. Since the structure of this tool holder has no such groove for the purpose of engagement with the spanner, because a groove may cause the tool holder to be thrown off the dynamic balance at the time of high-speed rotations, it has the advantageous effect of enhancing the dynamic balance, eliminating any wind noise that is unavoidable at the time of high-speed rotations, and drastically reducing chattering vibrations.

However, concerning the above-described conventional tool holder, as the spanner is used to rotate (or fasten) the clamping nut, the fastening force is imparted together with the rotational force and operates in the radial direction of the clamping nut towards the inside of the clamping nut, thereby pressing, from the outer surface of the clamping nut, the screw or the needle roller part formed on the inner surface of the clamping nut. Accordingly, the frictional force that exists at this part increases, and it becomes difficult to rotate the clamping nuts thereby lowering work efficiency. There is also the possibility that the clamping force of the clamping nut will weaken and it becomes difficult to cause the tool holder to firmly hold the tool.

SUMMARY OF THE INVENTION

The present invention aims to solve the above-described conventional problems. It is the object of this invention to provide a clamping nut that can prevent, at the time of rotation of the clamping nut, a fastening force that is imparted in the radial direction of the clamping nut towards the inside of the clamping nut, from operating on a converting part, such as a screw or a needle roller part formed on the inner surface of the clamping nut, for the purpose of converting the rotary motion into rectilinear motion, that can enhance the rotation efficiency, and that can securely clamp the clamp object member.

It is another object of this invention to provide a tool holder with the above-described clamping nut.

It is yet another object of this invention to provide a spanner that can prevent, at the time of rotation of the clamping nut, a fastening force that is imparted in the radial direction of the clamping nut towards the inside of the clamping nut, from operating on the converting part, and that can enhance the rotation efficiency of the clamping nut.

In order to achieve the above-described objects, this invention provides a clamping nut for clamping or releasing a clamp object member, wherein the clamping nut is located in a rotatable manner on the outer surface of the clamp object member and comprises, on its inner surface, a converting part for the purpose of converting the rotary motion into rectilinear motion, wherein the clamping nut is moved back and forth by the rectilinear motion in the axial direction of the clamp object member, wherein the clamping nut is able to be rotated when it is held by a device for holding the outer surface of the clamping nut with a force that is imparted towards the inner surface of the clamping nut, and wherein the clamping nut has a non-contact area which takes the form of an annular shape along its outer surface in at least a section of the area that corresponds to the converting part, and which never comes in contact with the device.

The clamping nut of this structure has a non-contact area which takes the form of an annular shape along its outer surface in at least a section of the area that corresponds to the converting part, and which never comes in contact with the device. Accordingly, it is possible, at the time of rotation of the clamping nut, to prevent the fastening force imparted in the radial direction of the clamping nut towards the inside of the clamping nut, from operating on this non-contact area. Therefore, it is possible to enhance the rotation efficiency of the clamping nut and to securely clamp the clamp object member.

The non-contact area can be composed of, for example, an annular concave groove.

Moreover, the non-contact area can be formed over the entire area that corresponds to the converting part. A structure such as this makes it possible to further enhance the rotation efficiency of the clamping nut and to clamp the clamp object member more securely.

Concerning the clamping nut of this invention, a contact area for contact with the device can be provided in the area on the outer surface of the clamping nut that does not correspond to the converting part. If this structure is employed, the fastening force imparted in the radial direction of the clamping nut towards the inside of the clamping nut, at the time of rotation of the clamping nut, never operates on the converting part. Accordingly, it is possible to enhance the rotation efficiency of the clamping nut and to securely clamp the clamp object member.

The converting part can be composed of, for example, a screw or a plurality of needle rollers retained by a retainer.

Moreover, the clamp object member can be composed of a tool holder body capable of holding a tool inserted in its tool-holding part. In addition to the above-described advantages, a structure such as this makes it possible for the tool holder to securely hold the tool inserted in its tool-holding part.

Furthermore, this invention provides a tool holder comprising a tool holder body capable of holding a tool inserted in its tool-holding part, and the above-described clamping nut, wherein the tool holder clamps or releases the tool holder body in response to the rotation of the clamping nut located on the outer surface of the tool holder body, thereby holding or releasing the tool.

The tool holder of this structure can, at the time of rotation of the clamping nut, prevent the fastening force imparted in the radial direction of the clamping nut towards the inside of the clamping nut, from operating on the non-contact area. Accordingly, it is possible to enhance the rotation efficiency of the clamping nut and to securely clamp the tool holder body. Therefore, it is possible to hold the tool firmly.

Moreover, this invention provides a spanner for holding the outer surface of a clamping nut to make it rotate, the clamping nut being located in a rotatable manner on the outer surface of a clamp object member and comprising, over its inner surface, a converting part for the purpose of converting the rotary motion into rectilinear motion, thereby clamping or releasing the clamp object member by means of the rectilinear motion, wherein the spanner has a non-contact area which takes the form of an annular shape along its holding part for holding the outer surface of the clamping nut, and which never comes in contact with at least a section of the area on the outer surface of the clamping nut that corresponds to the converting part thereof.

The spanner of this structure can, at the time of rotation of the clamping nut, prevent the fastening force imparted in the radial direction of the clamping nut towards the inside of the clamping nut, from operating on the non-contact area. Accordingly, it is possible to enhance the rotation efficiency of the clamping nut and to securely clamp the clamp object member.

Moreover, the non-contact area can be composed of, for example, an annular concave groove.

Furthermore, the non-contact area can be formed over the entire area that corresponds to the converting part. A structure such as this makes it possible to further enhance the rotation efficiency of the clamping nut and to clamp the clamp object member more securely.

This invention also provides a spanner for holding the outer surface of a clamping nut to make it rotate, the clamping nut being located in a rotatable manner on the outer surface of a clamp object member and comprising, on its inner surface, a converting part for the purpose of converting the rotary motion into rectilinear motion, thereby clamping or releasing the clamp object member by means of the rectilinear motion, wherein the spanner holds the area on the outer surface of the clamping nut that does not correspond to the converting part, thereby causing the clamping nut to rotate.

Concerning the spanner of this structure, at the time of rotation of the clamping nut, the fastening force imparted in the radial direction of the clamping nut towards the inside of the clamping nut never operates on the converting part. Therefore, it is possible to enhance the rotation efficiency of the clamping nut and to securely clamp the clamp object member.

The clamp object member can be composed of a tool holder body capable of holding a tool inserted in its tool-holding part. In addition to the above-described advantages, if a structure such as this is employed, when the spanner is used to rotate the clamping nut, the tool holder can securely hold the tool inserted in its tool-holding part.

DETAILED DESCRIPTION OF THE PREFERRED EMBODIMENTS

Preferred embodiments of this invention are hereinafter described with reference to the attached drawings. In these embodiments, the tool insertion side of a tool holder is referred to as the "top-end" side, and the opposite side to be mounted on a machine tool spindle is referred to as the "base-end" side.

(Embodiment 1)

An explanation is hereinafter given about a tool holder as a clamp object member with a clamping nut according to Embodiment 1.

Figure 1:
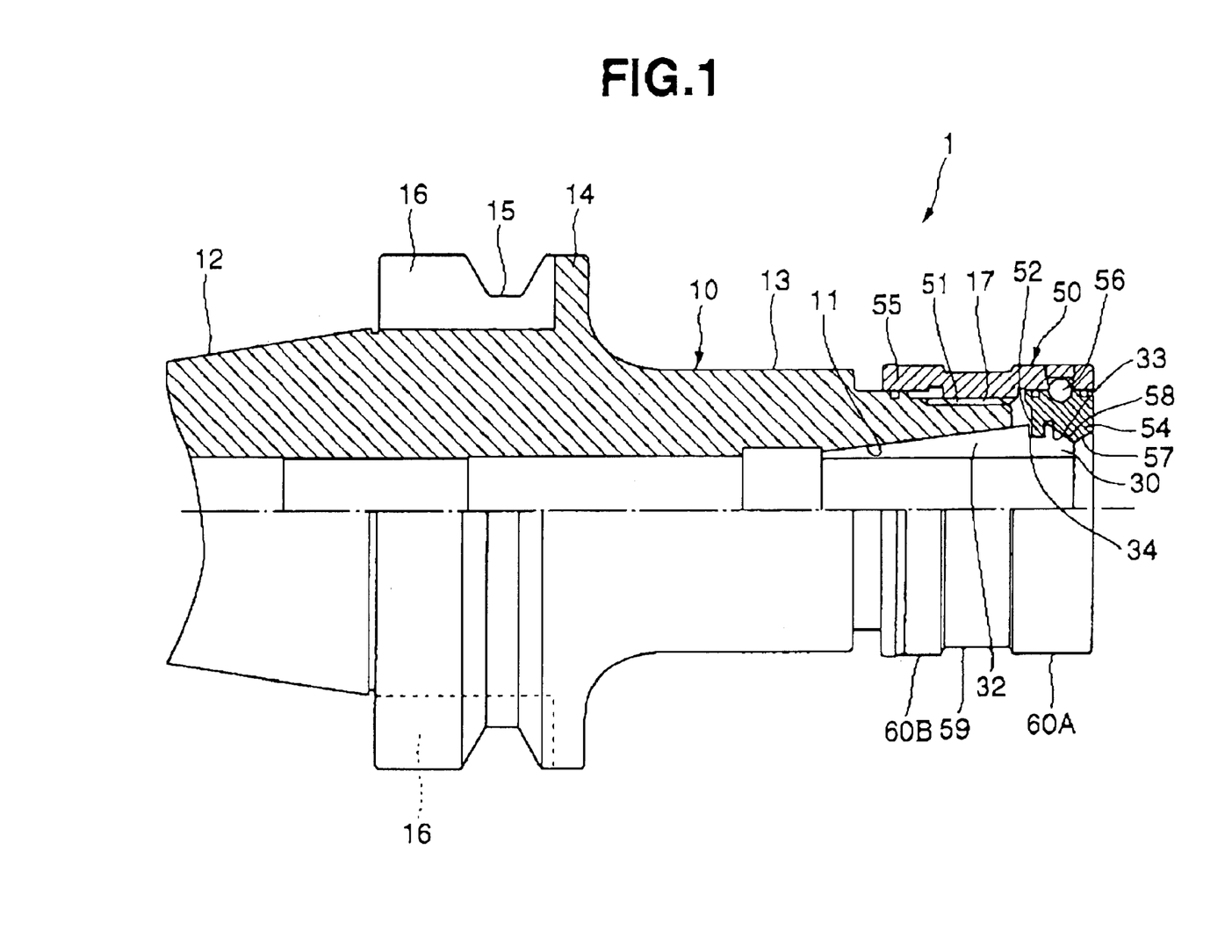
FIG. 1 is a partly sectioned view of a tool holder according to Embodiment 1 of this invention.
Figure 2:
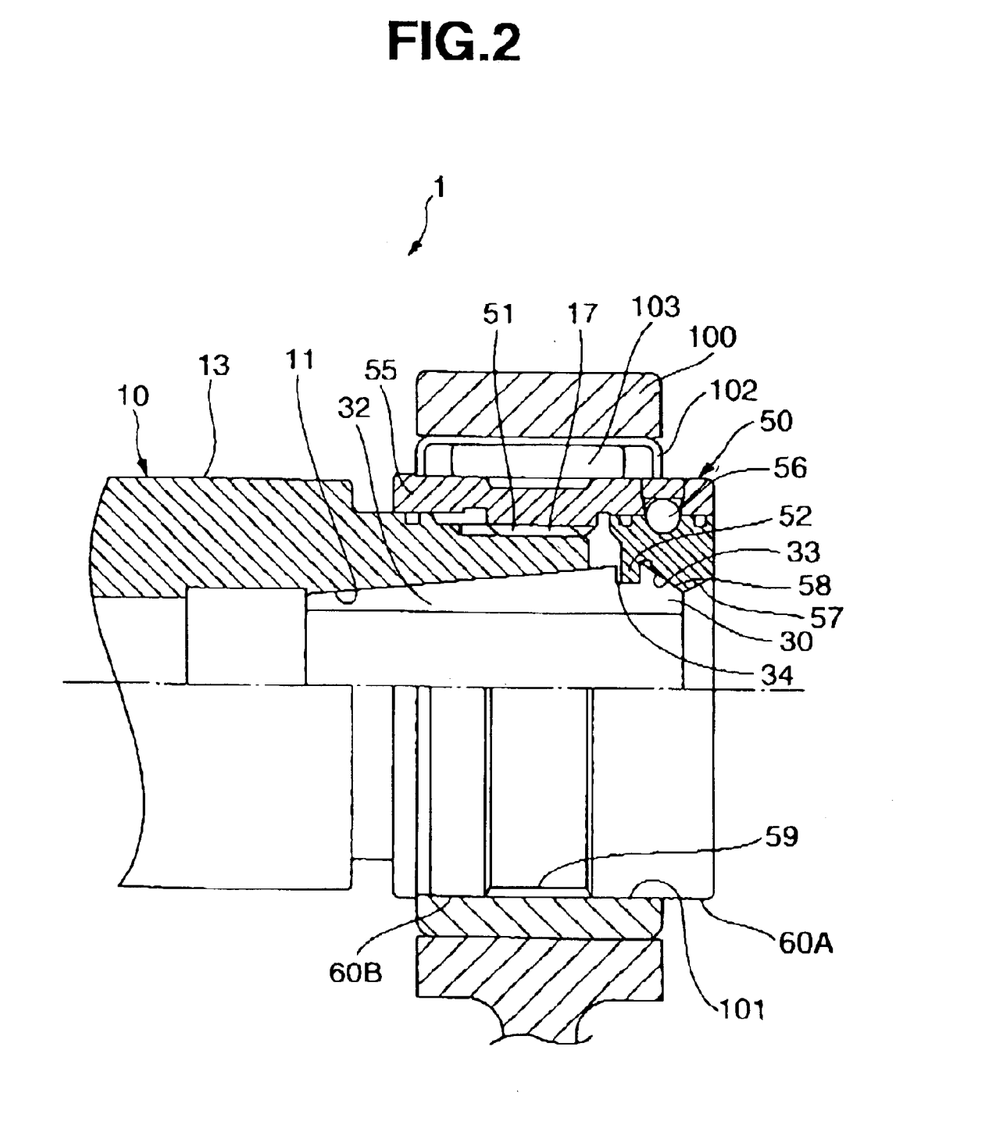
FIG. 2 is a partly sectioned view of the tool holder in FIG. 1 in the state where a spanner is used to tighten its clamping nut.

FIG. 1 is a partly sectioned view of a tool holder according to Embodiment 1 of this invention. FIG. 2 is a partly sectioned view of the tool holder in FIG. 1 in the state where a spanner is used to tighten its clamping nut.

As shown in FIGS. 1 and 2, a tool holder 1 of Embodiment 1 comprises: a tool holder body 10 capable of holding a tool (not shown in the drawings); a collet 30 inserted into a collet insertion hole 11 formed in the tool holder body 10; and a clamping nut 50 located in a rotatable manner on the outer surface of the tool holder body 10, for clamping or releasing the tool held in the tool holder body 10.

On the base-end side of the tool holder body 10, a taper shank 12 is in the form of a tapered shape that corresponds to (or is complimentary to) the inner surface of a tapered hole of a machine tool spindle (not shown in the drawings) Almost at the center section of the tool holder body 10, a flange 14 which is integrated with and positioned adjacent to the taper shank 12 is formed. Further on the top-end side, a tool-holding part 13 for holding the tool is formed in such a manner that it is integrated with and adjacent to the flange 14.

The flange 14 is constructed in a manner such that when the taper shank 12 is inserted into the tapered hole of the machine tool spindle and the tool holder 1 is thereby mounted on the machine tool spindle, the end face of the flange 14 on the base-end side comes in contact with the end face of the machine tool spindle. On the outer surface of the flange 14, a groove 15 that is to be held by a well-known manipulator is formed. Around the circumference of the flange 14, engagement concave parts 16 that are evenly spaced at an angle of 180° are formed for the purpose of engaging with engagement projections (not shown in the drawings) of the machine tool spindle in order to make the tool holder 1 rotate in an integrated manner with the machine tool spindle. In the tool-holding part 13, the collet insertion hole 11 is opened to insert the collet 30 for holding the tool therein. On the top-end side of the tool-holding part 13, a male screw 17 is formed around the outer surface of the tool-holding part 13 and engages with a female screw 51 formed around the inner surface of the clamping nut 50 described below in detail. Around the outer surface of this tool-holding part 13, the clamping nut 50 is mounted in a rotatable manner.

The collet 30 is a taper collet that has a plurality of slots 32 cut in an axial direction and evenly spaced at the same angle. The collet 30, together with these slots 32 formed therein, can expand or contract its diameter by means of elastic deformation, thereby releasing or holding the shank of the tool. The outer surface of the collet 30 on the top-end side is a taper part 33 to which the clamping nut 50 is attached. On the base-end side of this taper part 33 around the outer surface of the collet 30, an engagement concave part 34 is formed for the purpose of engaging with an engagement convex part 52 of the clamping nut 50.

The clamping nut 50 comprises: an engaging member 54 located on the top-end side of the collet 30 inserted into the tool holder 1; and a nut body 55 provided in a manner such that it is relatively free to be rotated through a coupling ball 56 on the outer surface of the engaging member 54, for clamping and securing the collet 30 towards the inner surface thereof (in its radial direction towards the inside thereof).

The engaging member 54 is composed of an annular member provided on the top-end side of the tool holder body 10. On the top-end side of the inner surface of the engaging member 54, a taper surface 57 is formed with its inside diameter getting gradually larger towards the top-end side. On the base-end side of the engaging member 54, an engagement convex part 52 is formed, which protrudes towards the shaft center from its inner surface, for the purpose of engaging with the engagement concave part 34 of the collet 30. Between the engagement convex part 52 and the taper surface 57, a taper surface 58 is formed for the purpose of contact with the taper part 33 formed on the top-end side of the collet 30.

On the inner surface of the nut body 55, a female screw 51 is formed for the purpose of engaging with the male screw 17 that is formed around the outer surface of the tool holder body 10 on the top-end side. This female screw 51 engages with the male screw 17 that is formed around the outer surface of the tool holder 10, thereby causing the nut body 55 to rotate and convert this rotary motion into rectilinear motion so as to move the nut body 55 in the axial direction of the tool holder body 10 As this nut body 55 rotates, it presses the engaging member 54 and the collet insertion hole 11 in an axial direction, thereby similarly compressing the collet 30 in its radial direction and securing the tool. Over the entire area on the outer surface of the nut body 55 that corresponds to the female screw 51, an annular concave groove 59 is formed. As shown in FIG. 2, this annular groove 59 constitutes a non-contact area that never comes in contact with a holding part 101 of a spanner 100 when the spanner 100 is used to rotate the clamping nut 50. On the other hand, both sides of this annular groove 59 (on the top-end side and the base-end side) constitute contact areas 60A and 60B for contact with the holding part 101 of the spanner 100 when the spanner 100 is used to rotate the clamping nut 50.

Referring to FIG. 2, the reference numeral 102 refers to a holder for holding a wedge member 103, and this wedge holder has a play area and a wedge area, both for receiving the wedge member 103. The wedge member 103 is configured to be located in the wedge area by either clockwise or counterclockwise rotation of the spanner 100 and to wedge into a space between the outer surface of the clamping nut 50 and the wall surface of the wedge area. This action causes the clamping nut 50 to rotate. On the other hand, the wedge member 103 is configured to move to the play area when the spanner 100 rotates in the opposite direction to the above-mentioned clockwise or counterclockwise direction. That is, if wedge member 103 is configured to be located in the wedge area by clockwise rotation, then wedge member 103 is configured to moved into the play area when the spanner 100 rotates in a counterclockwise direction. If wedge member 103 is configured to be located in the wedge area by counterclockwise rotation, then wedge member 103 is configured to move into the play area when the spanner 100 rotates in the clockwise direction.

An example of the spanner that can be used is a conventional type of spanner as described in Japanese Patent Laid-Open (Kokai) Publication No. HEI 7-68473.

In order to insert and set a tool in the tool holder 10 of the above-described structure, the shank of the tool (not shown in the drawing) is inserted from the top-end side of the collet 30 held by the tool holder 10 The spanner 100 is then used to rotate the nut body 55, thereby moving the engaging member 54 towards the collet 30. This action causes the taper part 33 of the collet 30 to contact and slide on the taper surface 58 of the engaging member 54 of the clamping nut 50, and also causes the outer surface of the collet 30 to contact and slide on the inner surface of the collet insertion hole 11 in the tool holder body 10, thereby making the collet 30 elastically deform in a diameter-contracting direction to commence fastening the shank of the tool.

When the spanner 100 causes the nut body 55 to rotate., the nut body 55 receives a fastening force in its radial direction towards the inside as well as the rotational force. Since the annular groove 59 is formed over the entire area of the outer surface of the nut body 55 that corresponds to the female screw 51, this area never comes in contact with the spanner 100 Accordingly, it is possible to prevent the fastening force that is imparted by the spanner in its radial direction towards the inside of the nut body 55, from operating on the female screw 51 section of the nut body 55. As a result, it is possible to enhance the rotation efficiency of the clamping nut 50 and to securely fasten the tool on the tool holder body 10 through the medium of the collet 30.

When the spanner 100 is used to rotate the nut body 55 of the clamping nut 50 in the opposite direction to the above-mentioned direction in order to release the clamping of the clamping nut 50 and remove the tool from the tool holder body 10, it is also possible to prevent the fastening force imparted by the spanner 100 in its radial direction towards the inside of the nut body 55 from operating on the female screw 51 section of the clamping nut 50.

Embodiment 1 has been described in accordance with a case in which the annular groove 59 is formed over the entire area on the outer surface of the nut body 55 that corresponds to the female screw 51 However, the invention is not limited to this structure, as long as the annular groove 59 takes on an annular shape around the outer surface of the nut body 55 and is formed in at least a section of the area that corresponds to the female screw 51 and around the outer surface of the nut body 55.

Figure 3:
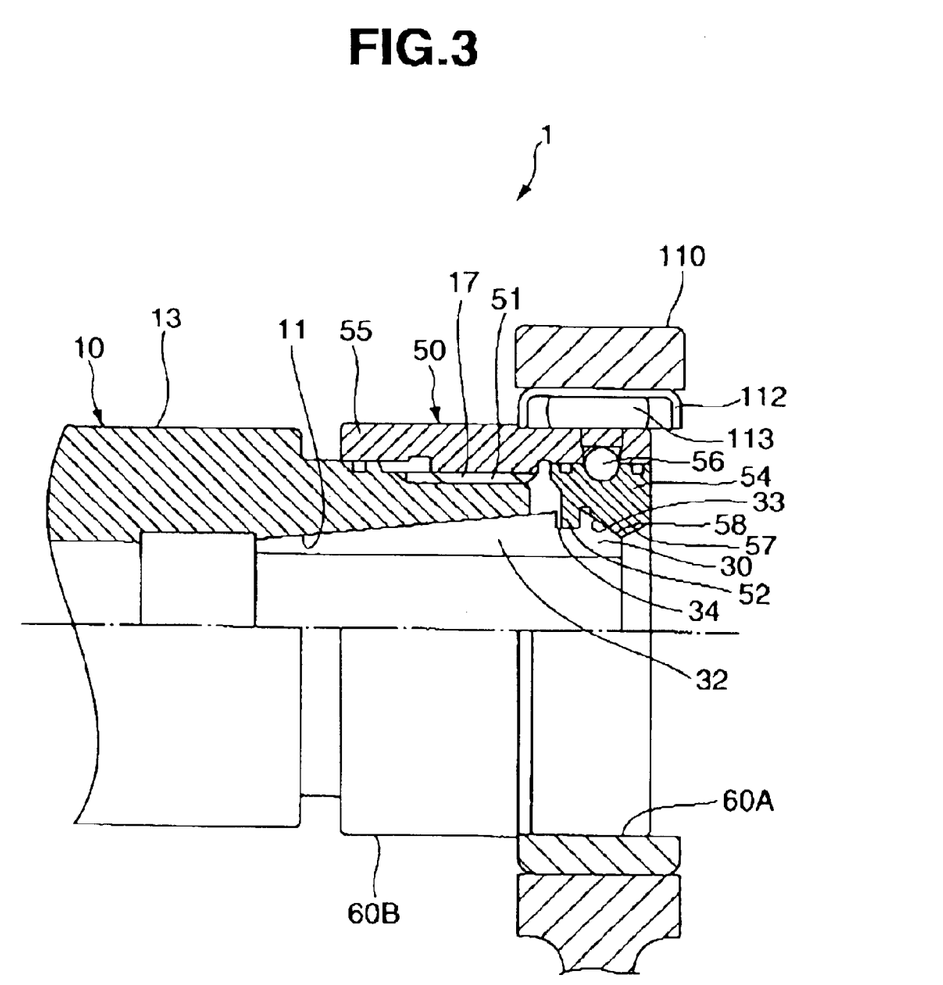
FIG. 3 is a partly sectioned view of a clamping nut according to another embodiment of this invention in the state where it is tightened by using a spanner.

Moreover, as shown in FIG. 3, instead of providing the annular groove 59 around the outer surface of the nut body 55 of the clamping nut 50, a spanner 110 that has the width for contact with only the contact area 60A may be used. In other words, this spanner 110 holds the area on the outer surface of the clamping nut 50 that does not correspond to the female screw 51, thereby causing the clamping nut 50 to rotate. Furthermore, the spanner 110 may hold the contact area 60B.

Referring to FIG. 3, the reference numeral 112 refers to a holder for holding a wedge member 113, and this wedge holder has a play area and a wedge area, both for receiving the wedge member 113. The wedge member 113 is configured to be located in the wedge area by either clockwise or counterclockwise rotation of the spanner 110 and to wedge into a space between the outer surface of the clamping nut 50 and the wall surface of the wedge area. On the other hand, the wedge member 113 is configured to move to the play area when the spanner 110 rotates in the opposite direction to the above-mentioned clockwise or counterclockwise direction. That is, if wedge member 113 is configured to be located in the wedge area by clockwise rotation, then wedge member 113 is configured to moved into the play area when the spanner 110 rotates in a counterclockwise direction. If wedge member 113 is configured to be located in the wedge area by counterclockwise rotation, then wedge member 113 is configured to move into the play area when the spanner 110 rotates in the clockwise direction.

In this case as well, the spanner 110 never comes in contact with the entire area on the outer surface of the nut body 55 that corresponds to the female screw 51. Accordingly, it is possible to prevent the fastening force imparted by the spanner 110 in its radial direction towards the inside of the nut body 55, from operating on the female screw 51 section of the clamping nut body 55, to enhance the rotation efficiency of the clamping nut body 55, and to securely fasten the tool to the tool holder body 10 through the medium of the collet 30.

Embodiment 1 has been described in accordance with a case in which the collet 30 is inserted into the tool holder.

The invention is not limited to this structure, but can be applied to various types of tool holders, for example, the type of tool bolder where a tool can be inserted directly into the tool insertion hole of the tool holder 10, and the clamping nut 50 then clamps the tool holder 10.

Moreover, Embodiment 1 has been described in accordance with a case in which the tool holder is used as the clamp object member. The invention is not limited to this structure, however, any clamp object member can be selected as long as it is configured to allow the clamping nut to be mounted on the outer surface of the clamp object member, and to rotate the clamping nut, thereby clamping the clamp object member.

(Embodiment 2)

An explanation is hereinafter given about a spanner according to Embodiment 2 of this invention with reference to the relevant drawings.

Figure 4:
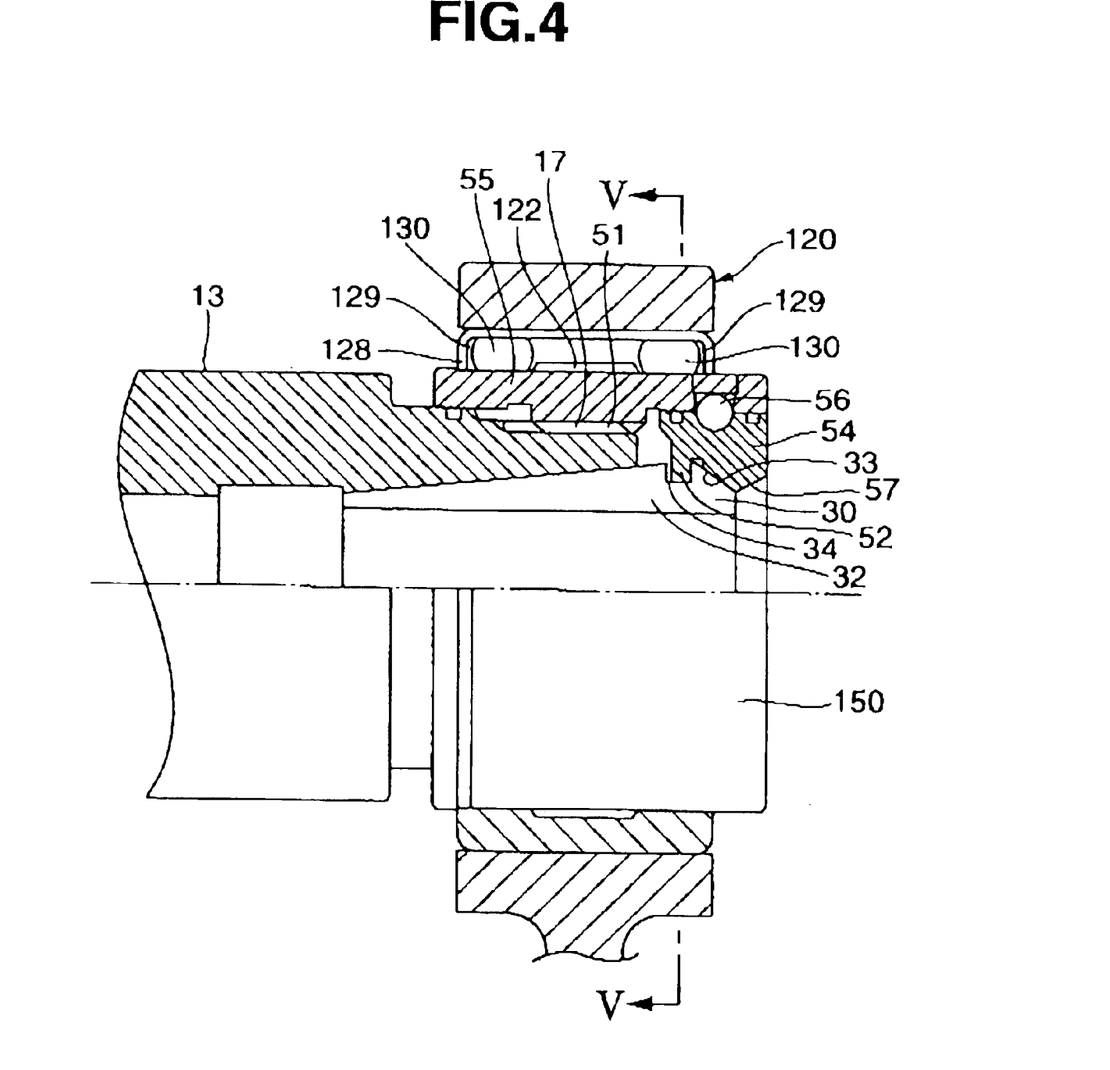
FIG. 4 is a partly sectioned view of a tool holder according to Embodiment 2 in the state where a spanner is used to tighten its clamping nut.
Figure 5:
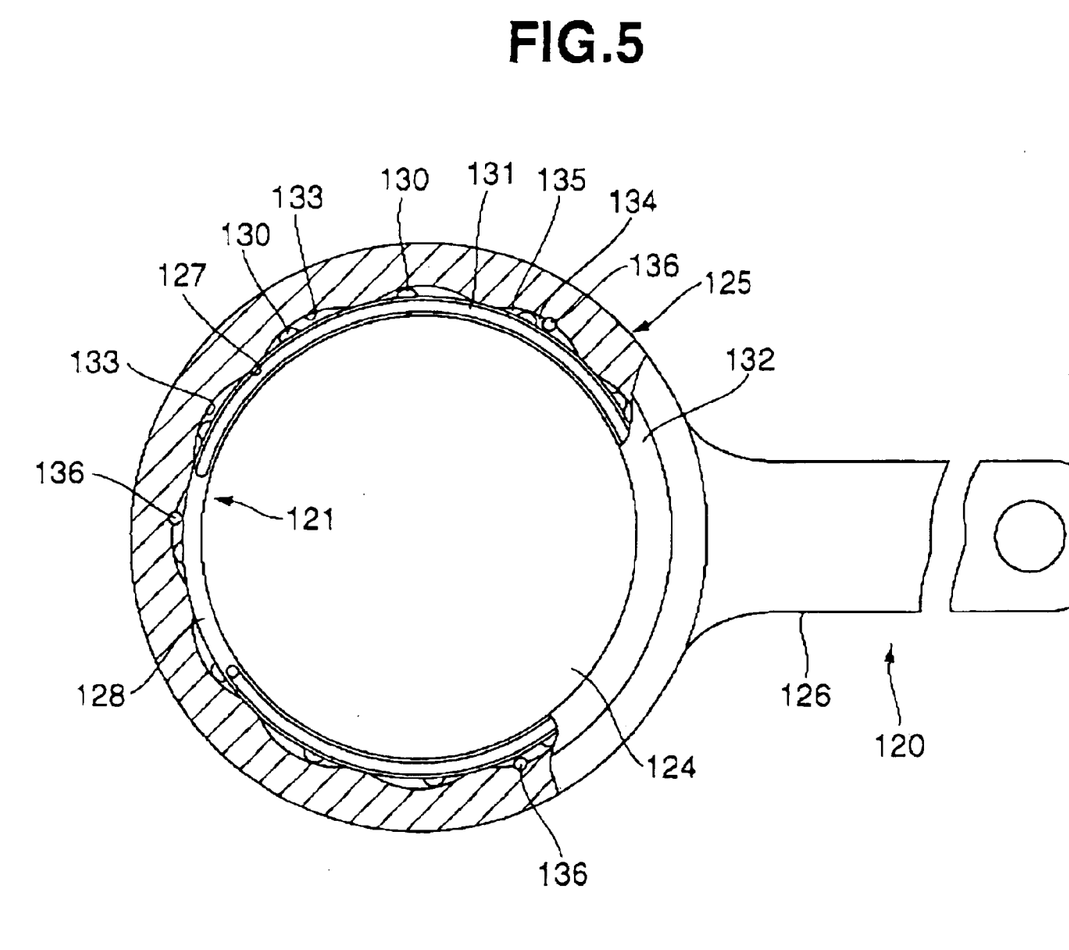
FIG. 5 is a partly sectioned view of a spanner as taken along line V—V in FIG. 4.
Figure 6:
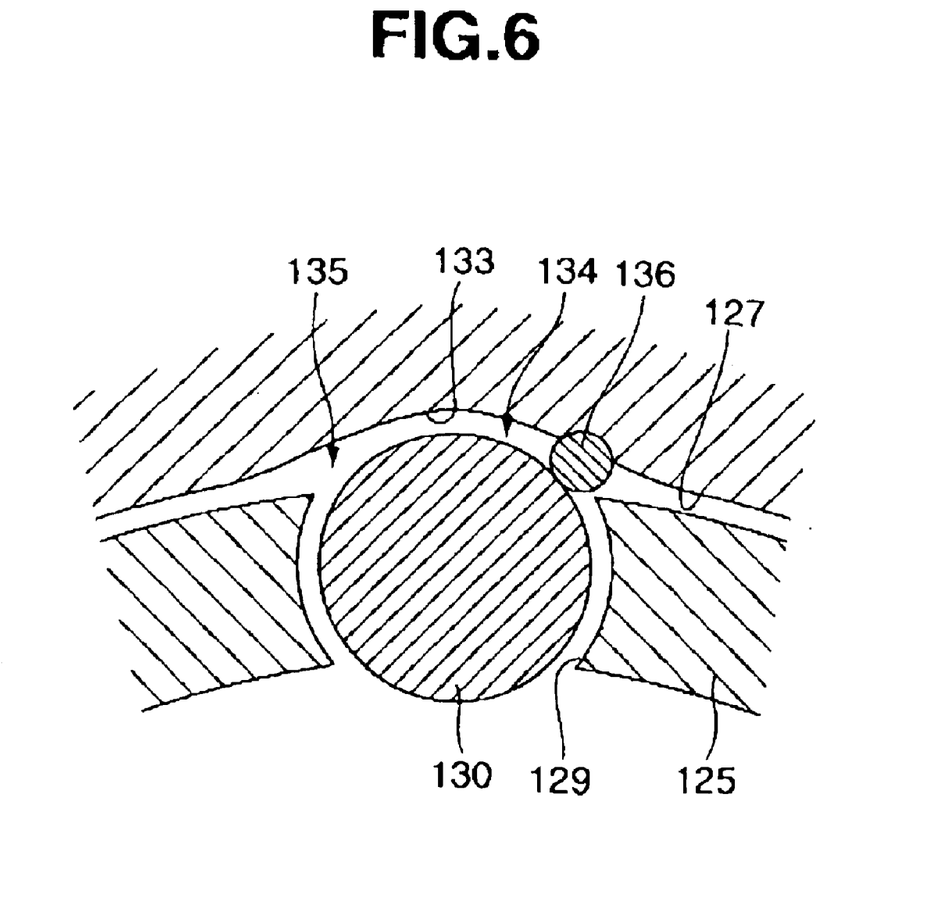
FIG. 6 is a fragmentary enlarged sectional view of the spanner of FIG. 5.

FIG. 4 is a partly sectioned view of a tool holder according to Embodiment 2 in the state where a spanner is being used to tighten its clamping nut. FIG. 5 is a partly sectioned view of a spanner as taken along line V—V in FIG. 4. FIG. 6 is a fragmentary enlarged sectional view of the spanner of FIG. 5.

A clamping nut 150 used in Embodiment 2 is a conventional type of clamping nut mounted on a conventional tool holder. As described in Embodiment 1, an annular groove 59 is not formed around the outer surface of the clamping nut 150.

As shown in FIGS. 4 through 6, a spanner 120 of Embodiment 2 comprises: a spanner body 125 having a circular section and including an opening 124, which has a slightly larger inside diameter than the outside diameter of the clamping nut 150 and into which the clamping nut 150 can be inserted; and a handle 126 integrated with the spanner body 125 About the two edges and along the circumference of the inner surface 127 of the opening 124, the wedge mechanisms as described below are located with a certain space therebetween, and this space corresponds to the entire area that corresponds to the female screw 51 which is formed around the inner surface of the clamping nut 150, thereby constituting the aforementioned non-contact area 122.

The wedge mechanism comprises a ring-shaped retainer 128 provided in a manner such that it is able to be rotated in its circumferential direction on the inner surface 127 of the spanner body 125; a spring 131 for urging the retainer 128 to move in either clockwise or counterclockwise direction; a cover 132 for suppressing this spring 131; and cylindrical wedge members 130 respectively received in each of the plural receiving grooves 129 formed in the retainer 128.

The receiving groove 129 formed in the retainer 128 is configured to receive the wedge member 130 in a manner such that it is able to be rotated and incapable of moving in the circumferential direction of the retainer 128. A plurality of receiving grooves 129 are positioned with an appropriate distance between them around the circumference of the inner surface 127. This structure allows the plural wedge members 130 to move in the circumferential direction of the retainer 128 and in a manner such that it is integrated with the retainer 128.

On the inner surface 127 of the spanner body 125, a groove 133 that includes a play area 134 and a wedge area 135 is formed. The reference numeral 136 refers to a stopper for preventing the wedge member 130 from moving from the play area 134 to another wedge area 135 located towards the clockwise side. This stopper ensures that the wedge member 130 moves only from the play area 134 to the wedge area 135 located towards the counterclockwise side, and vice versa.

The spring 131 takes on the form of a substantial ring shape. One end of the spring 131 engages with an engagement groove (not shown in the drawing) formed on the top face of the retainer 128, and the other end of the spring 131 engages with an engagement groove (not shown in the drawing) formed on the cover 132. This structure allows the retainer 128 to always be urged to move in the direction in which the wedge member 130 moves from the play area 134 to the wedge area 135.

The spanner 120 of this structure is locked with the clamping nut 150 only when it rotates in either clockwise or counterclockwise direction, thereby causing the clamping nut 150 to rotate. Since the above-described wedge mechanisms are located with a certain space (non-contact area 122) therebetween about the two edges and along the circumference of the inner surface 127 of the opening 124, when the spanner 120 is used to rotate the clamping nut 150, the spanner 120 never comes in contact with the outer surface of the nut body 55 that corresponds to the female screw 51. Accordingly, it is possible to prevent the fastening force imparted by the spanner 120 in its radial direction towards the inside of the nut body 55 from operating on the female screw 51 section of the nut body 55. As a result, it is possible to enhance the rotation efficiency of the clamping nut 150 and to securely fasten the tool to the tool holder body 10 through the medium of the collet 30.

Embodiment 2 has been described in accordance with a case in which the non-contact area 122 is formed in the section corresponding to the entire area on the inner surface 127 of the spanner 120 that corresponds to the female screw 51 of the clamping nut 150 However, the invention is not limited to this structure, as long as the non-contact area 122 takes the form of an annular shape along the inner surface of the spanner 120 and is formed at least in a section of the area that corresponds to the female screw 51

Moreover, Embodiment 2 has been described in accordance with the spanner 120 which has the structure to lock the outer surface of the clamping nut 150 by using the wedge members 130. However, the invention is not limited to this structure, and other structures may be employed as long as the holding part for holding the outer surface of the clamping nut 150 includes the non-contact area that never comes in contact with at least a section of the area that corresponds to the female screw 51 of the clamping nut 150.

Furthermore, Embodiment 2 has been described in accordance with the spanner for fastening (or rotating) the clamping nut of the tool holder. However, the spanner of this invention is not limited to this usage, but is also capable of rotating the clamping nut which is mounted in such a manner that it can be rotated on any clamp object member (Embodiment 3)

An explanation is hereinafter given about a tool holder as a clamp object member with a clamping nut according to Embodiment 3 of this invention.

Figure 7:
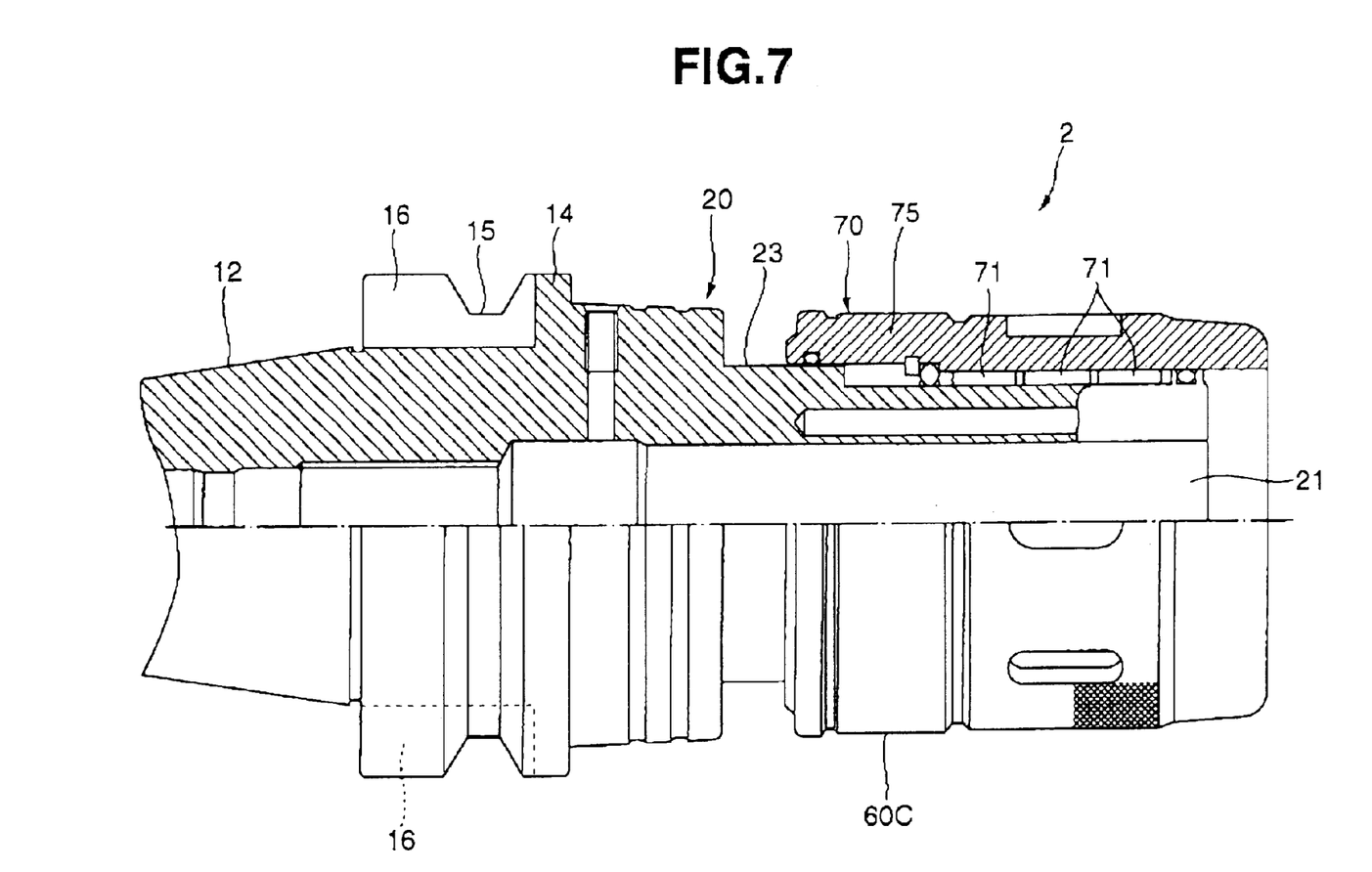
FIG. 7 is a partly sectioned view of a tool holder according to Embodiment 3 of this invention in the state where its clamping nut is not fully fastened.
Figure 8:
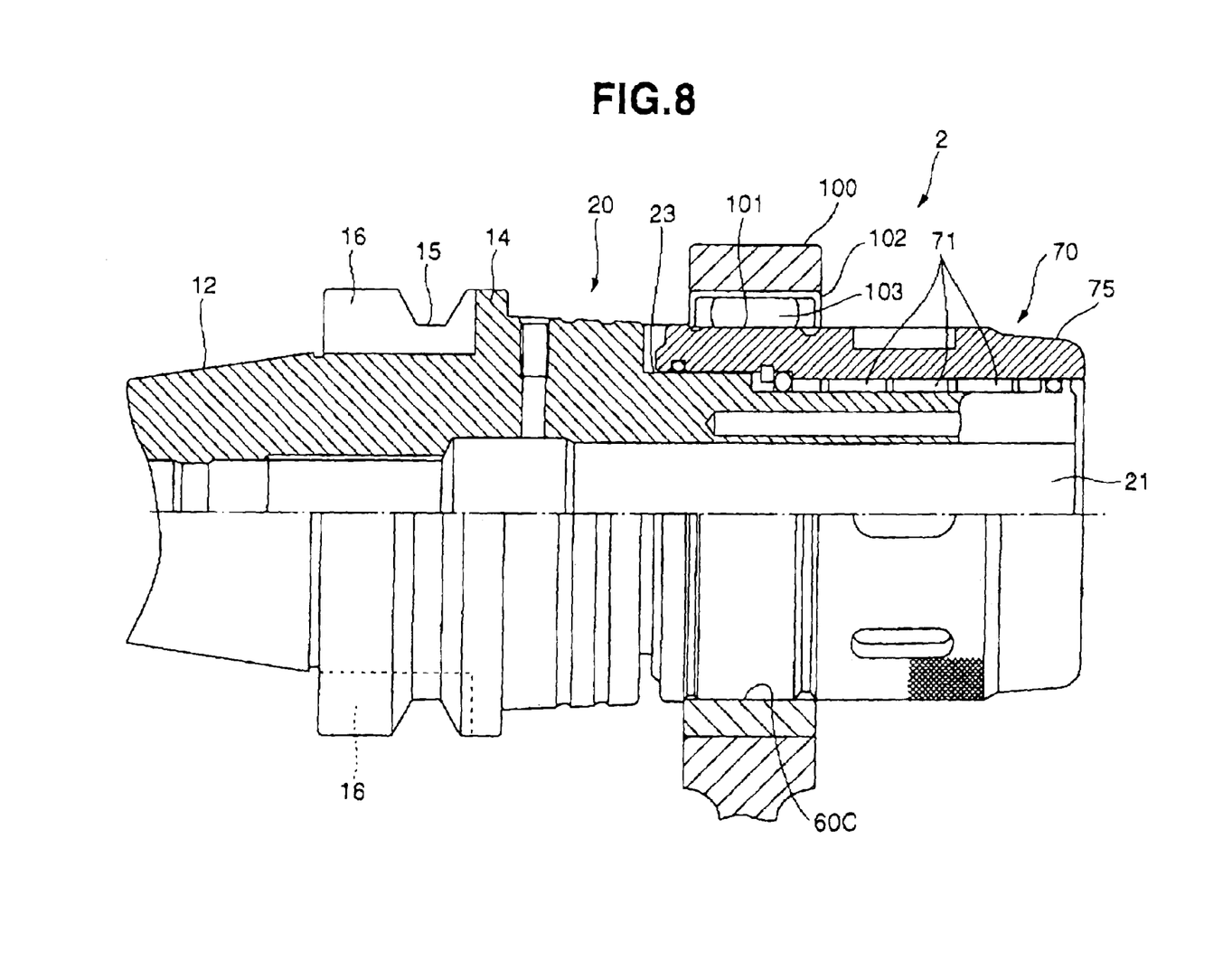
FIG. 8 is a partly sectioned view of the tool holder according to Embodiment 3 of this invention in the state where its clamping nut is fully fastened.

FIG. 7 is a partly sectioned view of a tool holder according to Embodiment 3 of this invention in the state where its clamping nut is not fully fastened. FIG. 8 is a partly sectioned view of the tool holder according to Embodiment 3 of this invention in the state where its clamping nut is fully fastened.

Concerning Embodiment 3, elements similar to those described about the tool holder of Embodiment 1 are given the same reference numerals, and any detailed description thereof is omitted.

As shown in FIGS. 7 and 8, the differences between a tool holder 2 of Embodiment 3 and the tool holder 1 of Embodiment 1 are the structure of a tool-holding part 23 formed on the top-end side of a tool holder body 20 and the structure of a clamping nut 70.

The tool-holding part 23 has a tool insertion hole 21, and the outer surface of the tool-holding part 23 is tapered so that its diameter becomes slightly smaller towards the top-end side. On the outer surface of the tool-holding part 23 is mounted the clamping nut 70 in a rotatable manner through the medium of a multiplicity of needle rollers 71 which revolve in a spiral.

The clamping nut 70 comprises: a nut body 75 retained in a manner such that it is able to be freely rotated; and a plurality of needle rollers 71 incorporated between the nut body 75 and the tool-holding part 23 of the tool holder body 20.

The axis of each needle roller 71 is slightly inclined toward the axis of the tool-holding part 23. The needle rollers 71 cause the nut body 75 to rotate, thereby converting this rotary motion to rectilinear motion and causing the nut body 75 to move in the axial direction of the tool holder body 20. As this nut body 75 rotates, it presses the tool holder body 20 in its radial direction, thereby causing the diameter of the tool insertion hole 21 to contract and securing the tool.

On the outer surface of the nut body 75 at a position closer to its base-end side than the entire area that corresponds to the needle rollers 71, a contact area 60C for the contact with the holding part 101 of the spanner 100 at the time of rotation of the clamping nut 70 by the spanner is formed around the outer surface of the nut body 75 Concerning Embodiment 3, the entire area on the outer surface of the nut body 75 that corresponds to the needle rollers 71, constitutes a non-contact area that never comes in contact with the spanner 100.

In order to insert and set a tool in the tool holder 20 of the above-described structure, the shank of the tool (not shown in the drawing) is inserted from the top-end side of the tool insertion hole 21 formed in the tool holder 20. The spanner 100 is then used to rotate the nut body 75. When the spanner 100 causes the nut body 75 to rotate, the nut body 75 receives the fastening force in its radial direction towards the inside as well as the rotational force. Since the entire area on the outer surface of the nut body 75 that corresponds to the needle rollers 71 never comes in contact with the spanner 100, the fastening force that is imparted by the spanner 100 in its radial direction towards the inside of the nut body 75, never operates on the above-mentioned area. Even if the movement of the nut body 75 in the axial direction of the tool holder body 20 causes the position of the needle rollers 71 in the tool holder body 20 to be moved, since the contact area 60C is formed closer to the base-end side than the needle rollers 71 of the nut body 75, it is possible to rotate the nut body 75 without any difficulty. As a result, it is possible to enhance the rotation efficiency of the clamping nut 70 and to securely fasten the tool on the tool holder body 20.

When the spanner 100 is used to rotate the nut body 75 of the clamping nut 70 in the opposite direction to the above-mentioned direction in order to release the clamping of the clamping nut 70 and remove the tool from the tool holder body 20, advantageous effects similar to those described above can be obtained because the fastening force imparted by the spanner 100 in its radial direction towards the inside of the clamping nut 70, never operates on the needle rollers 71.

Embodiment 3 has been described in accordance with a case in which the non-contact area that never comes in contact with the spanner 100 is formed over the entire area on the outer surface of the nut body 75 that corresponds to the needle rollers 71. However, the invention is not limited to this structure, as long as the non-contact area takes the form of an annular shape along the outer surface of the nut body 75 and is formed at least in a section of the area on the outer surface of the nut body 75 that corresponds to the area where the needle rollers 71 are formed.

Embodiment 3 has been described in accordance with a case in which the tool holder is used as the clamp object member. The invention is not limited to this structure, however, any clamp object member can be selected as long as it is configured to allow the clamping nut to be mounted on the outer surface of the clamp object member, and to rotate the clamping nut, thereby clamping the clamp object member.

As described above, the clamping nut of this invention can, at the time of rotation thereof, prevent the fastening force imparted in its radial direction towards the inside thereof from operating on the converting part formed on the inner surface of the clamping nut, far the purpose of converting the rotary motion into rectilinear motion. As a result, it is possible to enhance the rotation efficiency of the clamping nut and to securely fasten the clamp object member.

Moreover, the tool holder of this invention can, at the time of rotation of the clamping nut, prevent the fastening force imparted in its radial direction towards the inside thereof, from operating on the converting part formed on the inner surface of the clamping nut, for the purpose of converting the rotary motion into rectilinear motion. As a result, it is possible to enhance the rotation efficiency of the clamping nut and to securely fasten the clamp object member.

Furthermore, when the clamping nut is rotated, the spanner of this invention never causes the fastening force imparted in its radial direction towards the inside of the clamping nut to operate on the converting part of the clamping nut. As a result, it is possible to enhance the rotation efficiency of the clamping nut and to securely fasten the clamp object member.

What is claimed is:

1. A clamping nut for clamping or releasing a clamp object member,
    wherein the clamping nut is located in a rotatable manner on the outer surface of the clamp object member and comprises, on its inner surface, a converting part for the purpose of converting rotary motion into rectilinear motion,
    wherein the clamping nut is moved back and forth by the rectilinear motion in the axial direction of the clamp object member,
    wherein the clamping nut is able to be rotated when it is held by a device for holding an outer surface of the clamping nut with a force that is imparted towards an inner surface of the clamping nut, and
    wherein the clamping nut has a non-contact area which takes the form of an annular concave groove along the outer surface of the clamping nut in at least a section of the area of the clamping nut that corresponds to the converting part, and which never comes in contact with the device.

2. A clamping nut for clamping or releasing a clamp object member,
    wherein the clamping nut is located in a rotatable manner on the outer surface of the clamp object member and comprises, on its inner surface, a converting part for the purpose of converting rotary motion into rectilinear motion,
    wherein the clamping nut is moved back and forth by the rectilinear motion in the axial direction of the clamp object member,
    wherein the clamping nut is able to be rotated when it is held by a device for holding an outer surface of the clamping nut with a force that is imparted towards an inner surface of the clamping nut,
    wherein the clamping nut has a non-contact area which takes the form of an annular shape along the outer surface of the clamping nut in at least a section of the area of the clamping nut that corresponds to the converting part, and which never comes in contact with the device, and
    wherein the non-contact area is formed over the entire area that corresponds to the converting part.

3. The clamping nut according to claim 1, wherein a contact area for contact with the device is provided in the area on the outer surface of the clamping nut that does not correspond to the converting part.

4. The clamping nut according to any one of claims 1, 2 and 3, wherein the converting part is a screw.

5. The clamping nut according to claim 1, wherein the non-contact area is formed over the entire area that corresponds to the converting part, and the converting part is a screw.

6. The clamping nut according to claim 2, wherein the non-contact area is an annular concave groove and is formed over the entire area that corresponds to the converting part, and the converting part is a screw.

7. The clamping nut according to any one of claims 1, 2 and 3, wherein the converting part is composed of a plurality of needle rollers retained by a retainer.

8. The clamping nut according to claim 1, wherein the non-contact area is formed over the entire area that corresponds to the converting part, and the converting part comprises a plurality of needle rollers retained by a retainer.

9. The clamping nut according to claim 2, wherein the non-contact area is an annular concave groove and is formed over the entire area that corresponds to the converting part, and the converting part comprises a plurality of needle rollers retained by a retainer.

10. The clamping nut according to any one of claims 1, 2 and 3, wherein the clamp object member is a tool holder body capable of holding a tool inserted in its tool-holding part.

11. A tool holder comprising a tool holder body capable of holding a tool inserted in a tool-holding part, and the clamping nut stated in any one of claims 1, 3, 5, 6, 8 and 9,
    wherein the tool holder clamps or releases the tool holder body in response to the rotation of the clamping nut located on the outer surface of the tool holder body, thereby holding or releasing the tool.

12. A spanner for holding an outer surface of a clamping nut to make it rotate, the clamping nut being located in a rotatable manner on an outer surface of a clamp object member and comprising, on its inner surface, a converting part for the purpose of converting the rotary motion into rectilinear motion, thereby clamping or releasing the clamp object member by means of the rectilinear motion,
    wherein the spanner has a non-contact area which takes the form of an annular shape along its holding part for holding the outer surface of the clamping nut, and which never comes in contact with at least a section of the area on the outer surface of the clamping nut that corresponds to the converting part thereof.

13. The spanner according to claim 12, wherein the non-contact area is an annular concave groove.

14. The spanner according to either one of claim 12 and 13, wherein the non-contact area is formed over the entire area that corresponds to the converting part.

15. A spanner for holding an outer surface of a clamping nut to make it rotate, the clamping nut being located in a rotatable manner on an outer surface of a clamp object member and comprising, on its inner surface, a converting part for the purpose of converting the rotary motion into rectilinear motion, thereby clamping or releasing the clamp object member by means of the rectilinear motion,
    wherein the spanner holds only an area on the outer surface of the clamping nut that does not correspond to the converting part, thereby causing the clamping nut to rotate.

16. The spanner according to either one of claims 12 and 13, wherein the clamp object member is a tool holder body capable of holding a tool inserted in its tool-holding part.

17. The spanner according to claim 15, wherein the clamp object member is a tool holder body capable of holding a tool inserted in its tool-holding part.

* * * * *